though Patent Office
3,324,669
Patented June 13, 1967

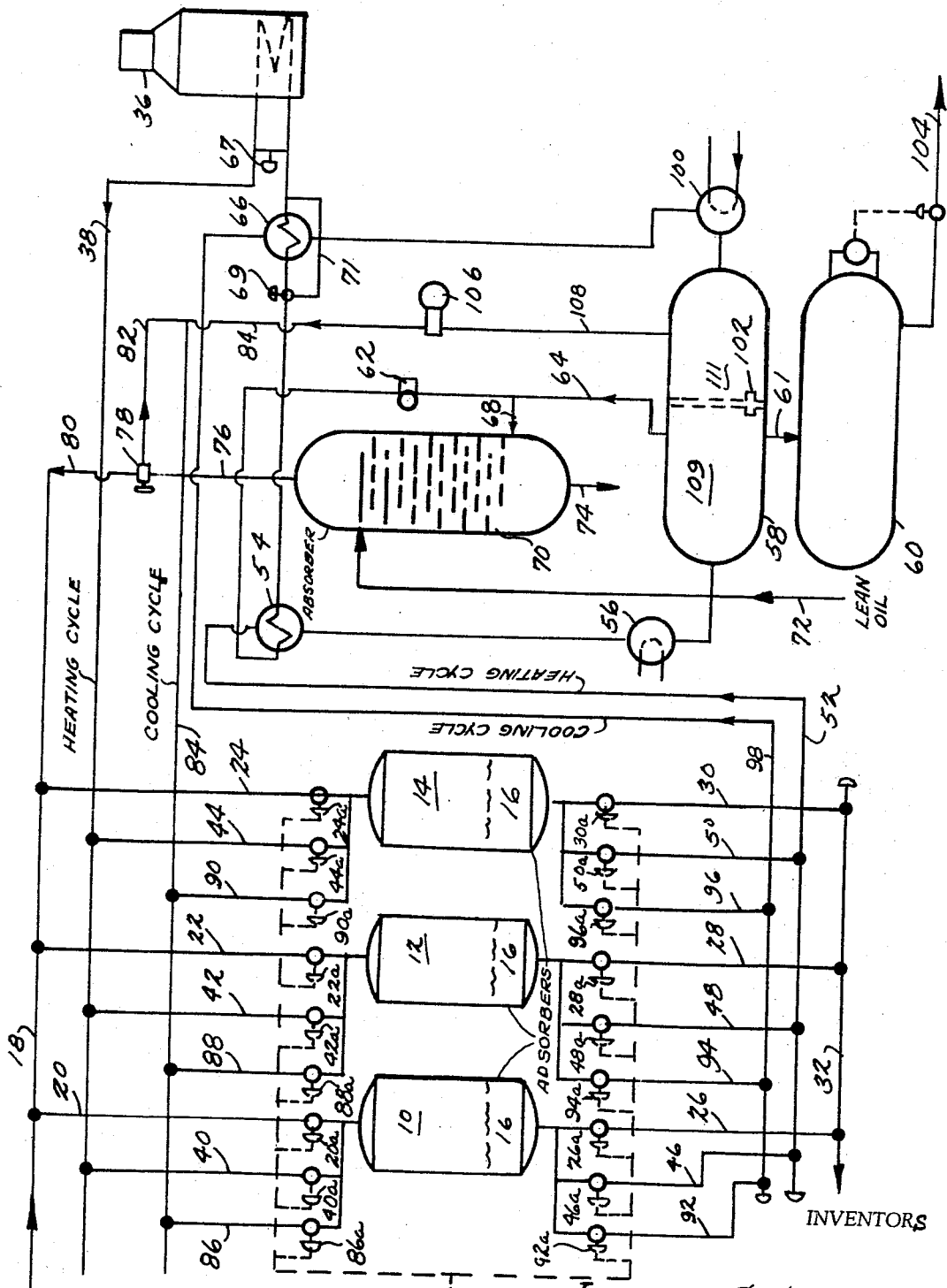

3,324,669
LEAN OIL CONTACT WITH THE REGENERATIVE MEDIUM FOR ADSORBERS
Jonathan C. Cooper, Pittsburgh, and John F. Villiers-Fisher, McKees Rocks, Pa., assignors to Pittsburgh Activated Carbon Company, Pittsburgh, Pa., a corporation of Pennsylvania
Filed June 8, 1964, Ser. No. 373,435
7 Claims. (Cl. 62—18)

This invention relates to a new and useful improvement in process of and an apparatus for recovering hydrocarbons from gas streams.

Generally, adsorption processes for the recovery of condensables such as water and hydrocarbons from a hydrocarbon gas stream involve an adsorption and a regeneration cycle, the regeneration cycle including a heating and cooling cycle. The overall adsorption process comprises flowing the gas stream through multi-stage adsorption beds while simultaneously heating and cooling other adsorption beds and shifting the flow of the gas stream consecutively to different adsorption beds in a predetermined sequence without interrupting the flow of the hydrocarbon gas stream.

Usually the flow of the hydrocarbon gas stream through an adsorption bed in the adsorption cycle to recover the condensables therefrom is conducted at a relatively low temperature. The subsequent operations on the bed thus loaded with these condensables, that is, the regeneration cycle, include a heating and cooling cycle. The heating regeneration cycle is performed at relatively high temperatures and preferably, comprises circulating a supply of heating gas through the bed which has completed the adsorption cycle. The heating gas is then passed through a heating regeneration circuit which includes a condenser and a separator. Heating of the adsorption bed drives the condensables therefrom and they are thereafter condensed and separated from the supply of heating gas.

The cooling cycle generally comprises circulating a cooling gas through a heated adsorbent bed and through a cooling circuit which also includes a condenser and separator whereby the heated bed is cooled and the condensables are condensed and separated from the cooling gas.

It has been found that during the heating cycle the non-condensable gases in the heating circuit expand and in order to prevent excessive pressure buildup in the heating circuit, excess gas in this circuit must be removed. It has also been found that certain of the desired adsorbates are relatively volatile and a significant portion of them do not condense in the heating circuit condenser located downstream of the adsorption bed. The noncondensed portion of these desired adsorbates are often lost when heating gas is expelled from the heating circuit.

Thus, in the recovery from a natural gas stream of hydrocarbons such as propane, butane, etc., significant quantities of methane and ethane which constitute the greater portion of the total natural gas stream composition, are absorbed along with the propane and butane. During the heating cycle the methane and ethane are substantially desorbed and thereby substantially contribute to the pressure buildup in the heating circuit. While the greater portion of the desorbed gas is recycled in the gas heating circuit before its desired condensable content rises to a significant value, the volume of the remaining desorbed gas, which is being recycled while the desired condensable content is rising towards its condensation partial pressure in the condenser, is larger than was heretofore believed. This remaining volume increases as the proportions of the pentanes and heavier components decrease and as the desired recovery of the condensables such as propane increases. At the same time, the partial pressure of the propane required to condense this component from the recirculating gas stream increases as the relative quantities of the heavier components decrease.

At the end of the heating cycle the free volume in the adsorption tower contains a large quantity of the desired volatile condensables. Moreover, significant quantities remain adsorbed on the bed since higher concentrations in the gas phase compensate in part for the higher adsorbent temperatures. When the bed is simultaneously cooled, these materials readsorb thus greatly diminishing the net working capacity of the bed.

It is therefore an object of this invention to provide a process of and an apparatus for recovering condensables from a gas stream which reduce the quantity desired condensables lost in measures employed to equalize the pressure in the heating cycle so that the pressure in the heating cycle is substantially equal to the pressure in the overall adsorption process.

A further object of the present invention is to provide a process of and an apparatus for recovering condensables from a gas stream by continuously circulating a gas stream through a heating circuit to heat an adsorbent bed and a gas stream through a cooling circuit for efficiently and effectively cooling the heated bed and bleeding a portion of said heating gas stream from said heating circuit to recover desired condensables therefrom and to compensate for pressure increases in the heating cycle.

Yet another object of the present invention is the provision of a process of and an apparatus for providing fluid communication between a heating gas and a cooling gas thereby insuring equalizing of gas pressures and volumes within a closed regeneration circuit and at the same time providing means associated with the closed regeneration circuit whereby gases in communication between said heating and cooling circuits are processed to remove desired condensables therefrom.

Yet a still further object of the present invention is the provision of a process of and an apparatus for recovering condensables from a hydrocarbon gas stream by passing the stream through a plurality of adsorbent beds which are simultaneously and continuously but alternately going through an adsorption and regeneration cycle said regeneration cycle comprising a heating regeneration cycle and a cooling regeneration cycle said heating regeneration cycle comprising circulating a supply of heating regeneration gas through the bed which has just completed the adsorption cycle, subsequently passing said heating gas through a heating regeneration circuit including a condenser and a separator thereby heating the adsorbed bed and driving the condensables out of the adsorbent bed and condensing and separating the condensables from the supply of heating gas, said cooling regeneration cycle comprising passing a supply of cooling gas through a heated adsorbent bed and subsequently through a cooling circuit which includes a condenser and a separator whereby the heated bed is cooled and the condensables are condensed and separated from the cooling gas, recycling a major portion of the heating gas through the heating circuit, bleeding a minor portion of said gas from said heating circuit, processing said minor portion of said heating gas to remove desired condensables therefrom and establishing fluid communication between the stripped bleed stream and said cooling regeneration circuit.

Yet a further object of the present invention is the provision of a process of and an apparatus for recovering condensables from a gas stream by providing a continuous process in which the adsorption, heating and cooling circuits are continuously operating thereby providing effective and maximum efficiency.

Other and further objects, features, and advantages will be apparent from the following description of a preferred embodiment of the invention, given for the purpose of disclosure and taken in conjunction with the accompanying drawings wherein:

The figure is a schematic flow diagram of the process and apparatus, constructed in accordance with the present invention.

In the drawings, 10, 12 and 14 designate vertical vessels or adsorption towers which have a bed of adsorbent material 16 disposed therein. The particular adsorbent material which is employed is subject to variations but it has been found that activated carbon is particularly useful. Other absorbents such as silica gel and molecular sieves can also be used. Both activated carbon and silica gel have an adsorption efficiency for the lighter hydrocarbons such as propane and butane as well as gasoline fractions. Moreover, silica gel will absorb water so that where it is desired to dehydrate a gas stream as well as recover hydrocarbons therefrom silica gel alone or in combination with activated carbon can be used. A main gas stream inlet line 18 is provided with conductors 20, 22, and 24, each leading respectively to beds 10, 12 and 14 and each having provided therebetween valves 20a, 22a and 24a. The position of valves 20a, 22a and 24a, which may be pressure actuated or suitably controlled by any well known mechanism, will determine the path of flow from the main inlet 18 to any of the adsorbing towers 10, 12 and 14. Discharge lines 26, 28 and 30 extend from the lower portion of the adsorbing towers 10, 12 and 14 and have connection to main gas stream outlet 32 through valves 26a, 28a and 30a. Thus with valves 22a, 24a, 28a and 30a closed to prevent main gas stream entrance to and exit from towers 12 and 14, the gas stream passes through conductor 18 thence to conductor 20 to tower 10 via open valve 20a where the condensables are adsorbed on the adsorbent bed 16. Thereafter, the lean gas passes out of the system through open valve 26a, conductor 26 and thence to main gas stream outlet 32. At this time, the adsorbing tower 10 is on an adsorbing cycle and as will be explained the towers 12 and 14 are undergoing regeneration.

After a predetermined laps of time, which, of course, is set in accordance with particular conditions, the control valves 20a and 26a are operated to shut off flow of the main gas stream to and from the tower 10 and upon a shift in the position of valves 22a and 28a, the main gas stream is directed from inlet line 18 through conductor 22 and open valve 22a into the upper portion of the adsorbing tower 12. The main gas stream then passes downwardly to the adsorbent material 16 in the tower 12 outwardly through open valve 28a, conductor 28 and discharge line 32. During this period, the tower 12 is on an adsorbing cycle and the hydrocarbons are extracted from the main gas stream by the bed of adsorbent material 16 in said tower.

Again, after a predetermined lapse of time, control valves 22a and 28a are operated to shut off flow of the main gas stream to and from the tower 12. The control valves 20a and 26a also remain in closed position and upon a shift in the position of valves 24a and 30a the main gas stream then passes downwardly through the bed of adsorbent material 16 in tower 14, outwardly through open valve 30a, conductor 30 and discharge line 32. During this period the tower 14 is on an adsorbing cycle and the hydrocarbons are extracted from the main gas stream by the bed of adsorbent material 16 in said tower.

The time cycle of each adsorbing period is predetermined and is preferably controlled by an automatic control arrangement which is generally indicated as a cycle control unit 34. This unit may be set to operate on a time cycle or it may be operated in accordance with temperature conditions. In either case its operation switches flow through the towers. The valves 20a, 22a, 24a 26a and 30a may be usual pressure actuated valves and at predetermined intervals the unit 34 controls the application or release of a pilot pressure to said valves to actuate said valves and to direct the flow from the main gas inlet line 18 to one of said towers.

After each tower has been on an adsorption cycle for a predetermined time the bed of adsorbent material 16 therein will become saturated with the hydrocarbons which are extracted from the main gas stream. As is well known in this art it is then necessary to regenerate or reactivate the bed by stripping or removing the adsorbed hydrocarbons from the bed and this is accomplished by directing the heating regeneration gas through the bed. The heat regeneration gas strips the bed of the hydrocarbon fraction by picking up such hydrocarbons and carrying them as vaporized liquids from the adsorbing tower. In the present arrangement, the heated regeneration gas is directed to one of the two towers which is not on an adsorbing cycle; that is, when the main gas stream is flowing through, say, adsorbing tower 10, the heating regeneration gas is directed through one of towers 12 and 14. At this same time there is being passed through the other of towers 12 and 14 a cooling regenerating gas which will be explained hereinafter. The heating regeneration gas is circulated through a separate and independent heating circuit which includes a suitable heater 36 having a conductor 38 extending therefrom. The conductor 38 is provided with conduits 40, 42 and 44, each leading respectively to towers 10, 12 and 14 and each being provided with valves 40a, 42a and 44a. The position of valves 40a, 42a and 44a may be pressure actuated and suitably controlled in the same manner as valves 20a, 22a and 24a. Discharge lines 46, 48 and 50 extend from the lower portion of the adsorbing towers 10, 12 and 14 and have connection with heating gas recycle line 52 through valves 46a, 48a and 50a.

When the control valves 40a and 46a are in one position the regenerating heating gas stream will flow from inlet line 38 through conductor 40, open valve 40a, into the upper end of the adsorption tower 10. The flow is then downwardly through the condensables-loaded adsorbent bed 16 to strip the bed of the hydrocarbon fraction previously adsorbed thereon from the main gas stream by picking up said hydrocarbon fraction and removing it from the bed in the form of vaporized constituents. The regeneration gas, containing the hydrocarbon fraction in vaporized form is discharged from the tower 10 through open valve 46a and conductor 46 which is in communication with line 52. It then passes through heat exchanger 54 giving out heat to the portion of the heating circuit 38 in which gas is being directed toward the heater 36. The rich gas then continues from the heat exchanger 54 to a suitable condenser 56 and then to a gas scrubber 58. At this time the adsorbing tower 10 is on a heating regeneration cycle and as hereinbefore explained one of the remaining two towers is on an adsorbing cycle while the other of said remaining towers is on a cooling regeneration cycle as will be explained hereinafter.

After a predetermined lapse of time, which, of course, again is set in accordance with particular conditions, the control valves 40a and 46a are operated to shut off the flow of the heating regeneration gas stream to and from the tower 10 and upon a shift in the position of valves 42a and 48a, the heating regeneration gas stream is directed from inlet line 38 through conductor 42, open valve 42a into the upper portion of the tower 12. The heating regeneration gas stream then passes downwardly through the bed of adsorbent material, vaporizing the condensables adsorbed thereon, and outwardly through open valve 48a, line 48, which is in communication with line 52, into heat exchanger 54, condenser 56 and gas scrubber 58, in a manner similar to that described above.

Again, after a predetermined lapse of time, the control valves 42a and 48a are operated to shut off the flow of heating regeneration gas stream to and from the tower 12 with valves 40a and 46a being caused to remain in the closed position and on a shift in the position of valves 44a and 50a, the heating regeneration gas stream is directed from inlet line 38 through conductor 44, open valve 44a into the upper portion of the tower 14. The heating regeneration gas stream then passes downwardly through the bed of adsorbent material, vaporizing the condensables adsorbed thereon, and outwardly through open valve 50a, line 50 which is in communication with line 52 into heat exchanger 54, condenser 56 and gas scrubber 58, in a manner heretofore described.

From the gas scrubber 58 wherein the condensables are separated from the vapors the condensed liquids are passed to a liquid product accumulator 60 through a line 61 and the major portion of the separated gas returns to the regeneration heating gas compressor 62 through conductor 64, thence through the heat exchanger 54 where it receive heat, through the heat exchanger 66 where it receives heat from the cooling circuit gas which has just passed through the hot bed, and thereafter to the regeneration heater 36 to repeat the cycle.

Alternatively, the major portion of heated regeneration gas after leaving the heat exchanger 66 may bypass the heater 36 through valve 67 to return to inlet line 38 to continue the heating cycle.

It is noted that heat exchangers 54 and 66 provide for effective and efficient heat transfer between the regeneration cooling circuits, thereby improving the thermal efficiency of the process. However, the temperature exchange in the heat exchanger 66 in the latter portion of the regeneration cycle becomes ineffective because the temperature in the cooling circuit 84 has decreased and the temperature of the heating circuit 30a has increased which would change the direction of the heat exchange. Therefore, a control valve 69 and a bypass circuit 71 are provided to divert the heating regeneration gas stream around the heat exchanger 66 during this latter portion of the cycle to prevent a reverse heat exchange in the heat exchanger 66. Suitable control means are provided to control valve 69.

A minor portion of the separated gas leaving the gas scrubber 58 through conductor 64 is bled therefrom through conductor 68 and is introduced into the lower portion of absorbing tower 70 to strip desired condensables therefrom. The absorption tower 70 can comprise a bubble or sieve tray type tower or it can comprise a refrigeration type tower. The desired condensables can be stripped from this minor portion which constitutes the bleed stream by a lean oil introduced into the upper portion of tower 70 through line 72. The enriched oil or condensed vapors are removed from absorbing tower through line 74 while the lean gas is expelled through line 76 adjacent the upper portion of tower 70. To compensate for the increased pressure in the heating circuit the vapors issuing from conductor 76 may be directed through a two-way valve 78 to either conductor 80 in communication with main gas stream 18 or to conductor 82 in communication with cooling circuit inlet line 84. The desired condensables can be recovered from the enriched lean oil leaving the tower through conductor 74 by a conventional process such as distillation. The stripped lean oil can then be recycled to the absorption tower 70 through conductor 72.

This expedient of processing the bleed stream increases significantly the amount of desired condensables recoverable from the main gas stream. Thus it has been found that processes which heretofore provided a 40% recovery of, say, propane, from a natural gas stream, when modified in accordance with this invention, can provide a 60% recovery of propane. Conventional processes which yield a 70% recovery of propane can be caused to yield a 100% recovery of this desired condensable.

Generally, the minor portion of the separated gas passing out the gas scrubber is bled off to the absorption tower 70 at system pressure although any pressure may be employed which permits economic scrubbing with lean oil.

An auxiliary adsorption system similar in form to the three bed system described can be employed in place of the lean oil absorber. Such a unit may be operated separately or in parallel by employing a portion of the existing inlet heating and cooling gas streams for regeneration and cooling and feeding the streams back to the appropriate outlets of the main stream beds. In this case the bleed stream substitutes for the main line stream in the bed on the adsorption cycle.

When refrigeration methods are employed to process a bleed stream, rather than an absorption tower utilizing a lean oil to strip the condensables therefrom, generally, any temperature below the condensation temperature of the desired condensable can be employed. For example, temperatures below 0° C. or even below −20° C. can be employed. The temperature employed, of course, will depend on the condensable being removed from the bleed stream.

Cooling circuit inlet line 84 is provided with conductors 86, 88 and 90, each leading respectively to beds 10, 12 and 14, and each having provided therebetween valves 86a, 88a and 90a. The position of valves 86a, 88a and 90a, which may also be pressure actuated or suitably controlled by any well known mechanism, will determine the path of flow from cooling inlet 84 to any of the adsorbing towers 10, 12 and 14. Outlet lines 92, 94 and 96 extend from the lower portion of the adsorbing towers 10, 12 and 14 and have connection to cooling gas recycle line 98 through valves 92a, 94a and 96a.

When the control valves 86a and 92a are in one position the regenerating cooling gas stream will flow from inlet line 84 through conductor 86, open valve 86a, into the upper end of the heated adsorption tower 10. The flow is then downwardly through the heated adsorbent bed 16, thereby cooling the bed as well as driving off the vaporized adsorbate left in the bed 16 from the previous heating cycle. The cooling gas supply passes through bed 16 through open valve 92a, conductor 92 which is in communication with recycle line 98 and then to heat exchanger 66 where it gives up heat to the heating circuit gas. The vaporized condensables contained in the cooling gas supply are then condensed in condenser 100 and passed to the gas scrubber 58 whereby the recovered liquid drains from the liquid product accumulator 60 through outline 61. The separated cooling gas returns to the regeneration cooling gas compressor 106 through conductor 108 and thence to conductor 84 to repeat the cooling cycle. Preferably, the gas scrubber is divided into two compartments, 109 and 111, compartment 109 being in communication with the heating regeneration gas recycle system and compartment 111 being in communication with the cooling regeneration gas recycle system.

In operation, assume that adsorption bed 10 is on the adsorption cycle, and that beds 12 and 14 are on the regeneration cycle with bed 12 being in the heating regeneration cycle and bed 14 being in the cooling regeneration cycle. Thus, as to bed 10, natural gas flows from the hydrocarbon gas stream 18 in the adsorption circuit through conductor 20, open valve 20a through the bed 16 and out conductor 26 through open valve 26a and thence to outlet 32. At the same time in the heating circuit 38, the heater 26 is heating a captive gas stream which is forced through the circuit 38 by the heating gas compressor 62 through the conductor 42, open valve 42a, through the saturated adsorbent bed 16 of tower 12 where the bed is heated and the heated gas drives off the adsorbed condensables. The heated condensables are passed through conductor 48 through open valve 48a to conductor 52 where they are passed through the heat exchanger 54 giving up heat and passing through the condenser 56 where the rich gas is cooled and condensed and then into the compartment 109 of gas scrubber 58 where the liquids are drawn off and transferred to the liquid product accumulator 60 through line 61 and out line 104. The major portion of the separated vapors are passed through the compressor 62 and are heated in the heat exchanger 54 and the heat exchanger 66 and passed to the heater 36 to be heated and then to continue the cycle. The minor portion of the separated vapors are processed in the manner heretofore described to remove condensables in adsorber 70.

In order to provide a pressure balance between the heating circuit 38 and the rest of the system, the minor portion of the gas separated in scrubber 58 is bled from the recycle line 64 via conductor 68 and introduced into an absorber 70 to remove desired condensables therefrom. These condensables are removed from the absorber through line 74 with the stripped vapors being passed to the main gas line 18 or to the cooling circuit 84. After each cycle has been concluded the cycle control unit 34 actuates the various control valves to transfer the bed 10 from the adsorption circuit 18 to the heating circuit 38, bed 12 is transferred from the heating circuit 38 to the cooling circuit 84 and bed 14 is transferred from the cooling circuit 84 to the adsorption circuit 18.

At the same time, adsorbent bed 14 is being cooled by the cooling circuit 84 wherein another gas stream is forced by the regeneration cooling compressor 106 through the hot adsorbent bed in tower 14 which has been previously heated thereby cooling the bed as well as driving off the vaporized adsorbate left in the bed 14 from the previous heating cycle. The cooling gas supply leaves bed 14 through open valve 96a and conductor 96, conductor 98 and is then passed to heat exchanger 66 where it gives up heat to the heating regeneration gas. The cooling regeneration gas is then passed through the condenser 100 to compartment 111 of the scrubber 58 whereby the recovered liquid drains to the liquid product accumulator 60 through port 102 and line 61. From the liquid product accumulator the desired condensable passes out line 104. The separated gas returns to the regeneration cooling gas compressor 106 to continue the cooling cycle. Thus, each bed continually adsorbs, is heated, cooled and again returned to adsorb.

The auxiliary bleed stream recovery system may be employed to recover the residues in the bed just leaving the heating step rather than the cold bed just leaving the adsorption step as in the solid bed extraction process. Increased flexibility of operation is obtained.

In addition, the technique of overlaying the rich residuals on the bed leaving the adsorption step is only applicable to systems using three or more beds per stage, one on adsorption, one on regeneration and one on cooling. The introduction of an auxiliary process system permits the use of only two beds per stage, one on adsorption and the other on heating for part of the cycle and cooling for the remainder. A two bed system using an auxiliary two bed adsorption system to process both the bleed stream and recover the residual products from the hot main stream bed at the end of the heating cycle will by virtue of the normal regeneration time sequence for the auxiliary beds require heat during the time the hot main stream bed is being cooled. This avoids a complete heater shut down with the high maintenance costs associated with attendant on-off operation.

The process of the invention will be described in even greater detail by the following specific example, although it is not intended to limit the invention in any way thereto.

A typical SBE adsorption system processing 200 million s.c.f./d. of natural gas at 500 p.s.i.a. and 100° F. having a composition of

|  | P.s.i.a. at 100° F. |
|---|---|
| $C_1$ | 478 |
| $C_2$ | 15 |
| $C_3$ | 3.9 |
| $C_4$ | 1.9 |
| $C_5$ | 0.8 |
| $C_6$ | 0.4 | employs adsorbers each containing 50,000 lbs. of carbon and would recover about 40% of the $C_3$ and 100% of all heavier components with a 17–19 min. adsorption cycle.

The regeneration gas flow is about 100 mol/min. The pressure equalizing flow depends chiefly on system volume and cycle length and is about 10 mol/min. average. The equalizing flow gas composition is the same as the condenser off gas composition and averages about

|  | P.s.i.a. at 100° F. |
|---|---|
| $C_1$ | 320 |
| $C_2$ | 70 |
| $C_3$ | 70 |
| $C_4$ | 35 |
| $C_5$ | 4 |
| $C_6$ | 1 | during the last 50% of the cycle during which the gas in this system would be rich enough to warrant processing by refrigeration.

Refrigeration to 0° F. yields a tail gas having the approximate composition

|  | P.s.i.a. at 100° F. |
|---|---|
| $C_1$ | 393 |
| $C_2$ | 65 |
| $C_3$ | 35 |
| $C_4$ | 7 |
| $C_5$ | 0.3 |
| $C_6$ | Trace |

Practically all the $C_5$ and heavier hydrocarbons are recovered, 80% of the $C_4$ and 50% of the $C_3$ are recovered. The increased working capacity of the adsorber by virtue of removal of this preload on the adsorber is about 12 mol $C_3$/cycle. The $C_3$ recovery is thereby increased from 40% to about 60%.

The foregoing disclosure and description of the invention is illustrative and explanatory thereof and various changes in the details of construction, arrangement and parts in the steps of the process may be made which will readily suggest themselves to those skilled in the art and which are encompassed within the spirit of the invention and the scope of the appended claims.

What is claimed is:

1. The process of recovering condensables from a main gas stream in an adsorption system wherein said gas stream is passed through a plurality of adsorbent beds which are simultaneously and continuously but alternately going through an adsorption and regeneration cycle, said regeneration cycle comprising a heating regeneration cycle and a cooling regeneration cycle, comprising passing said main gas stream through an adsorbent bed in said adsorption cycle to strip the condensables therefrom, discharging the stripped main gas stream from the adsorbent bed, discontinuing the flow of said main gas stream to the adsorbent bed, circulating a supply of heating gas through the condensable-loaded adsorbent bed to heat said bed and drive said condensables therefrom, condensing said condensables and separating the condensables from said heating gas, circulating a supply of cooling gas through the heated bed to cool said bed and to drive remaining condensables therefrom, condensing said condensables and separating the condensables from said cooling gas, recycling a major portion of the heating gas to said heating regeneration cycle, bleeding a minor portion of said heating gas from said heating regeneration cycle, removing a further portion of condensables from said bleed stream by flowing in counter current relation with a lean adsorption oil and flowing stripped bleed stream heating gas from where the condensables are removed from the bleed stream for recycle to the process.

2. The process of claim 1 where the stripped bleed stream heating gas is recycled to said main gas stream.

3. The process of claim 1 where the stripped bleed stream heating gas is recycled to said cooling regeneration cycle.

4. An adsorption apparatus for the recovery of condensables from a main gas stream in an adsorption system which includes a plurality of adsorbent beds and an adsorption, heating and cooling circuit and wherein the main stream is passed alternately through the beds where the beds are simultaneously and continuously but alternately going through an adsorption, heating and cooling circuit, said adsorption circuit including said plurality of adsorbent beds containing adsorbent material for the removal of condensables from said main gas stream when passed therethrough, said heating circuit comprising a network of conductors, a heating means, a bed which has adsorbed condensables from the main gas stream, condensing means, separating means, pumping means for continuously circulating a major portion of the heating gas through said heating circuit, means to bleed a minor portion of the heating gas from said heating circuit, means to remove a further portion of condensables from said bleed stream by flowing in counter current relation with a lean adsorption oil and means to recycle stripped bleed stream from the means to remove condensables from said bleed stream, and said cooling circuit comprising a network of conductors, cooling means, a bed that has been heated in the heating circuit, condensing means, separating means and pump means for continuously circulating the cooling gas through the cooling circuit whereby the heated bed is cooled and the condensables separated from the cooling gas.

5. The apparatus of claim 4 wherein means to recycle stripped bleed stream are in fluid communication with the main gas stream.

6. The apparatus of claim 4 wherein means to recycle stripped bleed stream are in fluid communication with said cooling circuit.

7. The apparatus of claim 4 wherein the adsorbent bed is activated carbon.

References Cited

UNITED STATES PATENTS

| | | | |
|---|---|---|---|
| 3,061,992 | 11/1962 | Russell | 55—180 X |
| 3,121,002 | 2/1964 | Kilgore et al. | 55—180 X |
| 3,124,438 | 3/1964 | Laverty | 55—62 X |
| 3,137,549 | 6/1964 | Kilgore et al. | 55—62 X |

OTHER REFERENCES

Advances in Petroleum Chemistry and Refining, W. M. Dow, vol. IV, pages 102 and 103, November 1961.

NORMAN YUDKOFF, *Primary Examiner.*

V. W. PRETKA, *Assistant Examiner.*